United States Patent
Coffin et al.

(10) Patent No.: US 11,286,854 B2
(45) Date of Patent: Mar. 29, 2022

(54) DUCTED OIL SCOOP FOR GAS TURBINE ENGINE

(71) Applicant: United Technologies Corporation, Farmington, CT (US)

(72) Inventors: James B. Coffin, Windsor, CT (US); Joseph D. Walker, West Hartford, CT (US); Todd A. Davis, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 358 days.

(21) Appl. No.: 16/535,454

(22) Filed: Aug. 8, 2019

(65) Prior Publication Data

US 2021/0040888 A1 Feb. 11, 2021

(51) Int. Cl.
*F02C 7/06* (2006.01)
*F01D 25/18* (2006.01)

(52) U.S. Cl.
CPC .............. *F02C 7/06* (2013.01); *F01D 25/18* (2013.01); *F05D 2260/98* (2013.01)

(58) Field of Classification Search
CPC ......... F02C 7/06; F01D 25/18; F05D 2260/98
See application file for complete search history.

(56) References Cited

U.S. PATENT DOCUMENTS

| | | | |
|---|---|---|---|
| 4,468,066 A | 8/1984 | Alcorta et al. | |
| 4,648,485 A * | 3/1987 | Kovaleski | F01D 25/18 184/13.1 |
| 6,409,464 B1 | 6/2002 | Fisher et al. | |
| 7,244,096 B2 * | 7/2007 | Dins | F01D 25/20 415/88 |
| 10,731,558 B2 * | 8/2020 | Schwendenmann | F16C 35/073 |
| 10,823,174 B2 * | 11/2020 | Violet | F02C 7/06 |
| 2003/0039421 A1 * | 2/2003 | Fisher | F16C 33/6677 384/462 |
| 2006/0213726 A1 * | 9/2006 | Gekht | F16C 33/6685 184/11.4 |
| 2008/0110813 A1 | 5/2008 | Munson | |
| 2013/0283758 A1 * | 10/2013 | Wotzak | F01D 25/18 60/39.08 |
| 2014/0271151 A1 * | 9/2014 | Belmonte | F02C 7/06 415/175 |
| 2015/0065285 A1 | 3/2015 | McCune et al. | |

(Continued)

FOREIGN PATENT DOCUMENTS

EP 2657463 A1 10/2013

OTHER PUBLICATIONS

European Search Report for EP Application No. 20188873.2 dated Nov. 10, 2020.

*Primary Examiner* — Michael R Mansen
*Assistant Examiner* — Mark K Buse
(74) *Attorney, Agent, or Firm* — Carlson, Gaskey & Olds, P.C.

(57) ABSTRACT

A gas turbine engine includes a rotating shaft. An oil scoop rotates with the rotating shaft. The oil scoop has end walls spaced axially along an axis of rotation of the rotating shaft and an axially central recess. A duct is spaced radially outwardly of the oil scoop. The duct has an oil inlet, with an oil supply nozzle to supply oil into the oil inlet in the duct. The oil inlet is then connected to supply oil into the recess. The oil scoop has an inner hole to allow oil to flow from the recess to an outer periphery of the shaft.

17 Claims, 3 Drawing Sheets

(56) References Cited

U.S. PATENT DOCUMENTS

| | | | |
|---|---|---|---|
| 2016/0131034 A1* | 5/2016 | Chilton | F16C 33/6659 |
| | | | 184/6.11 |
| 2016/0348522 A1 | 12/2016 | Labbe | |
| 2017/0234222 A1* | 8/2017 | Schwendenmann | F16C 35/073 |
| | | | 184/6.11 |
| 2019/0120085 A1* | 4/2019 | Walker | F16C 33/66 |
| 2020/0291818 A1* | 9/2020 | Davis | F16N 7/38 |

* cited by examiner

DUCTED OIL SCOOP FOR GAS TURBINE ENGINE

BACKGROUND

This application relates to an oil scoop to direct oil at components in a gas turbine engine.

Gas turbine engines are known and typically include a fan delivering air into a bypass duct as propulsion air, and further delivering air into a compressor. The air is compressed in the compressor and delivered into a combustor where it is mixed with fuel and ignited. Products of combustion pass downstream over turbine rotors, driving them to rotate. The turbine rotors, in turn, drive compressor and fan rotors.

Historically, a fan drive turbine drove a low pressure compressor rotor and a fan and a fan rotor at a common speed. However, more recently, a gear reduction has been included between the fan drive turbine and the fan.

The gear reduction requires lubrication. Many other components in the gas turbine engine also require lubrication. It becomes particularly important to efficiently manage lubricant in modern gas turbine engines to improve efficiency.

SUMMARY

In a featured embodiment, a gas turbine engine includes a rotating shaft. An oil scoop rotates with the rotating shaft. The oil scoop has end walls spaced axially along an axis of rotation of the rotating shaft and an axially central recess. A duct is spaced radially outwardly of the oil scoop. The duct has an oil inlet, with an oil supply nozzle to supply oil into the oil inlet in the duct. The oil inlet is then connected to supply oil into the recess. The oil scoop has an inner hole to allow oil to flow from the recess to an outer periphery of the shaft.

In another embodiment according to the previous embodiment, there is a gap between a radially outer location on the end walls and a radially inner surface on the duct, and the gap is less than 0.050 in (0.127 cm).

In another embodiment according to any of the previous embodiments, the nozzle extends along an angle which is non-perpendicular to an axis of rotation of the rotating shaft.

In another embodiment according to any of the previous embodiments, the nozzle extends along a direction which is generally tangential to an outer periphery of the rotating shaft.

In another embodiment according to any of the previous embodiments, the duct has at least one breather hole for allowing air to flow into a chamber between the recess and an inner peripheral surface of the duct.

In another embodiment according to any of the previous embodiments, there are a plurality of the breather holes.

In another embodiment according to any of the previous embodiments, the oil scoop has a plurality of the inner holes at a radially inner surface to allow oil to flow to the shaft.

In another embodiment according to any of the previous embodiments, the duct is fixed against rotation.

In another embodiment according to any of the previous embodiments, the oil scoop is positioned axially adjacent a bearing supporting the rotating shaft.

In another embodiment according to any of the previous embodiments, the duct has at least one breather hole for allowing air to flow into a chamber between the recess and an inner peripheral surface of the duct.

In another embodiment according to any of the previous embodiments, the oil supply nozzle includes a plurality of oil supply nozzles.

In another embodiment according to any of the previous embodiments, the duct is fixed against rotation.

In another featured embodiment, the gas turbine engine includes a turbine rotor driving a shaft. The shaft is supported on a bearing. An oil scoop rotates with the shaft. The oil scoop has end walls spaced axially along an axis of rotation of the shaft and an axially central recess. A duct is spaced radially outwardly of the oil scoop. The duct has an oil inlet, with an oil supply nozzle to supply oil into the oil inlet in the duct. The oil inlet is then connected to supply oil into the recess. The oil scoop has an inner hole to allow oil to flow from the recess to an outer periphery of the shaft.

In another embodiment according to the previous embodiment, there is a gap between a radially outer location on the end walls and a radially inner surface on the duct, and the gap is less than 0.050 in (0.127 cm).

In another embodiment according to any of the previous embodiments, the nozzle extends along an angle which is non-perpendicular to an axis of rotation of the shaft.

In another embodiment according to any of the previous embodiments, the nozzle extends along a direction which is generally tangential to an outer periphery of the shaft.

In another embodiment according to any of the previous embodiments, the duct has at least one breather hole for allowing air to flow into a chamber between the recess and an inner peripheral surface of the duct.

In another embodiment according to any of the previous embodiments, the oil supply nozzle includes a plurality of oil supply nozzles.

In another embodiment according to any of the previous embodiments, the oil scoop has a plurality of the inner holes at a radially inner surface to allow oil to flow to the shaft.

In another embodiment according to any of the previous embodiments, the duct is fixed against rotation.

These and other features may be best understood from the following drawings and specification.

DETAILED DESCRIPTION

Figure 1:
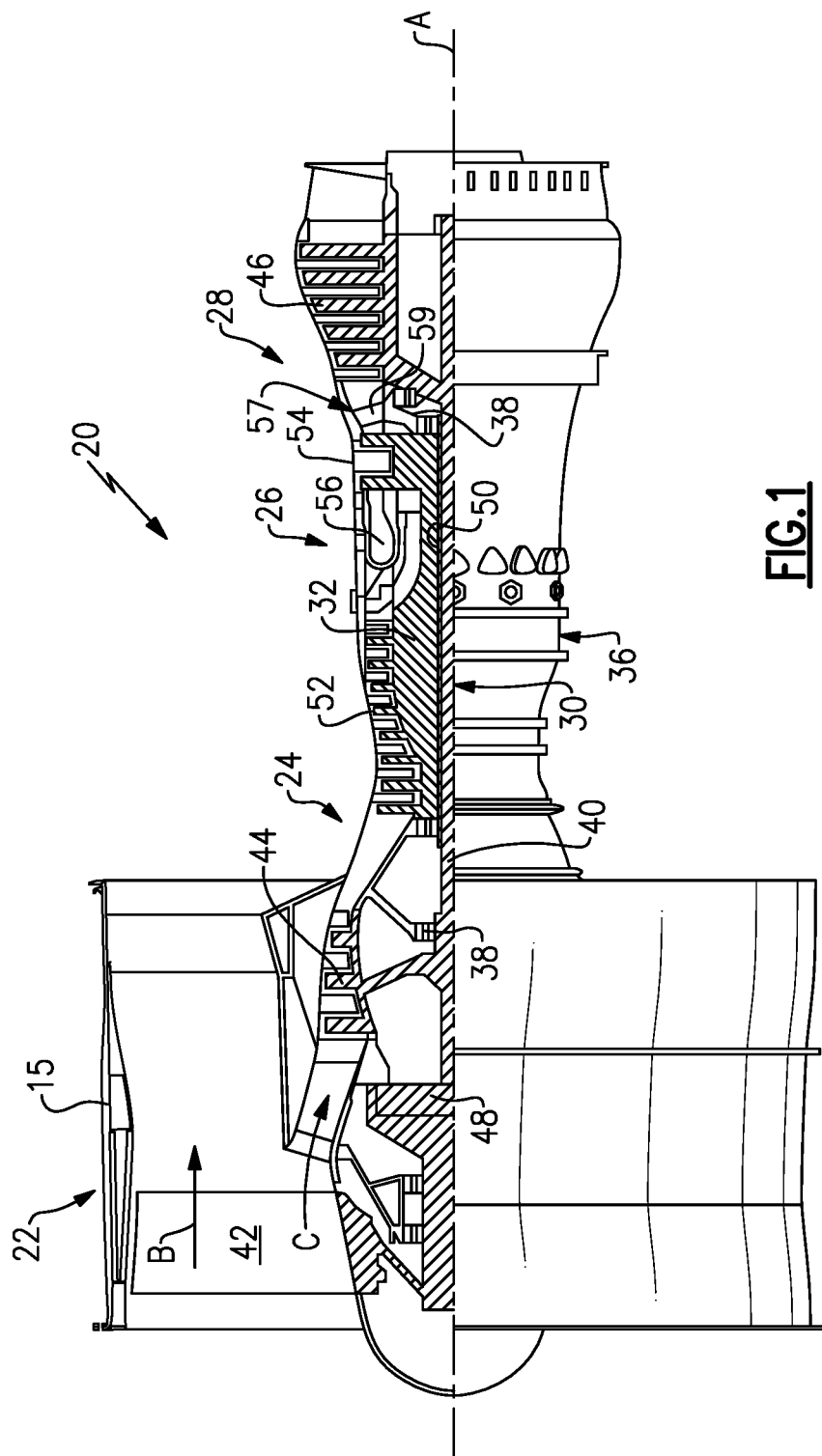
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R.)/(518.7°\ R.)]^{0.5}$. The "Low corrected fan tip speed" as disclosed herein according to one non-limiting embodiment is less than about 1150 ft/second (350.5 meters/second).

Figure 2A:
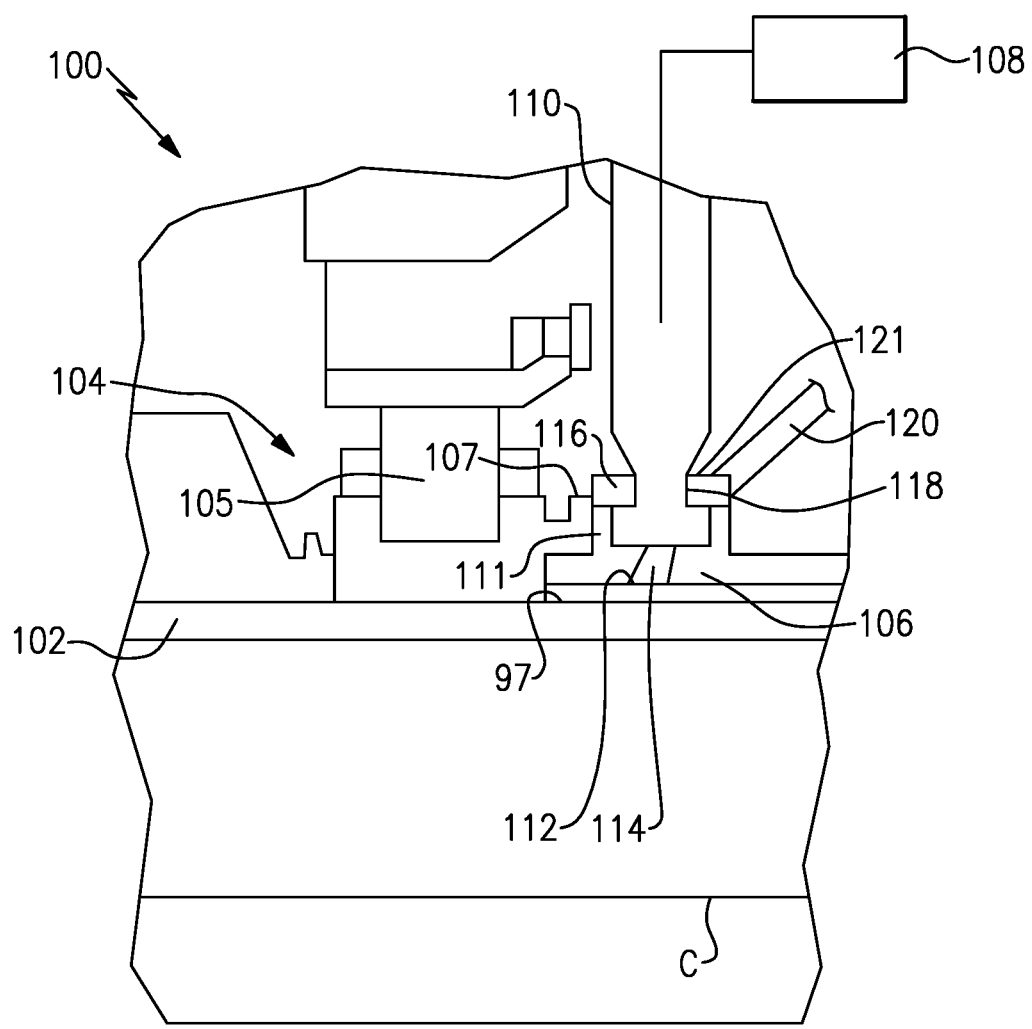
FIG. 2A shows an oil scoop.

FIG. 2A shows a detail 100 of an area 104 adjacent to a bearing 105. The bearing 105 supports a turbine shaft 102 for rotation. This structure may be incorporated into an engine such as shown in FIG. 1. It is desirable to supply oil to the bearing 105. Thus, a lubricant supply, which would typically include a pump (collectively 108), delivers oil into a nozzle 110. The nozzle 110 directs oil through a duct 116 having an opening 118 to receive the oil. Opening 118 functions as an oil inlet. The oil moves into an oil scoop 106. The duct 116 is fixed such as shown schematically by a member 120.

The oil scoop 106 rotates with the shaft 102. Oil scoop 106 has an axially central recess 112 which extends radially outwardly for a lesser distance than end walls 111. Inner holes or openings 114 allow oil to flow from the recess 112 to an outer periphery 97 of the shaft 102. This provides lubrication to the bearing 105. Of course, the scoop can be associated with other bearing compartment components.

Figure 2B:
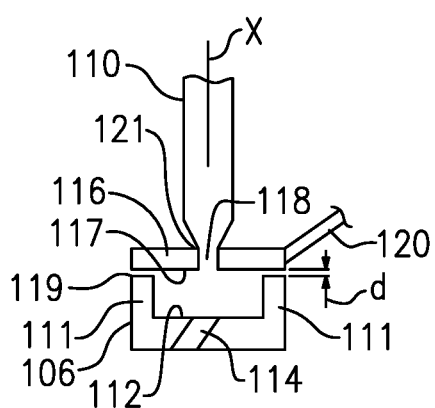
FIG. 2B shows a detailed view of the oil scoop.

As shown in FIG. 2B, the duct 116 has an inner peripheral surface 117 spaced closely from an outer peripheral surface 119 of the walls 111. A gap distance d is shown. The gap distance d, as shown in FIG. 2B, may be exaggerated to show its existence. In fact, it is desirably kept very small. The gap distance d may be less than 0.050 in (0.127 cm) and in embodiments less than 0.030 in (0.076 cm).

Oil is jetted into recess 112 from the nozzle 110 and through the opening 118. The duct 116 allows rejected oil to be reingested by the scoop, rather than splashed into the compartment as was the case in the prior art arrangement. In the prior art, there was a good deal of wasted use of the oil, thus, lowering the efficiency. As shown, the nozzle 110 may be fixed at 121 to the opening 118 to minimize leakage.

As shown in FIG. 2B, the nozzle 110 extends along an angle x which is non-perpendicular to a rotational axis C. Angle x may be within 5 degrees of vertical.

Figure 2C:
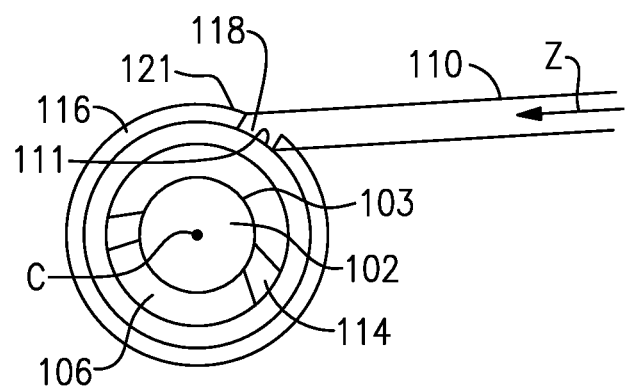
FIG. 2C shows another view of the oil scoop.

As shown in FIG. 2C, the nozzle 110 also extends along an angle z in the plane of FIG. 2C which is generally tangential to an outer periphery 103 of the shaft 102. Angle Z is usually within 5 degrees of tangent to the scoop as opposed to the way it is presented in the figure.

Figure 3A:
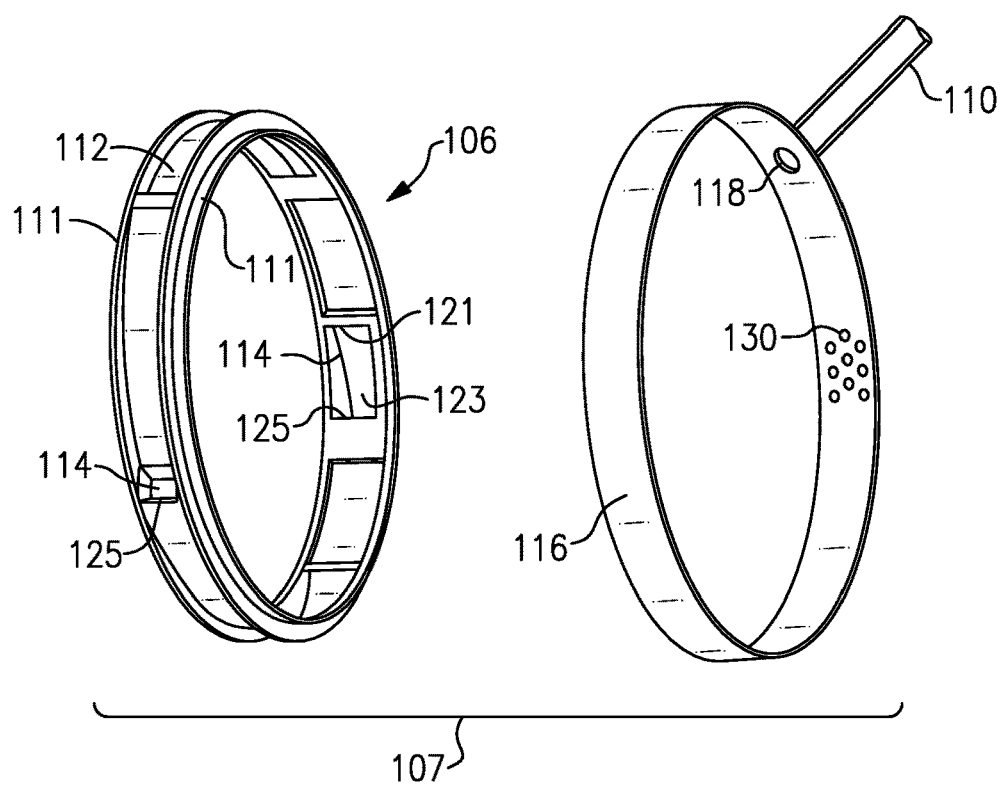
FIG. 3A shows an exploded view of components in the oil scoop.

Details of the scoop 106 and duct 116 are shown in FIG. 3A. The openings 114 can be seen to have an upstream end 125 and a downstream end 121. As shown from the outer periphery of the opening 114 in FIG. 3A, the end 125 extends into the opening 114 leading oil to downstream end 121 at an inner periphery and a bottom wall 123. Thus, oil comes in at an angle into the recess 112 and is directed to the outer periphery of the shaft 102.

The duct 116 includes the opening 118 and a plurality of breather or screen holes 130. This will allow a small amount of air to enter the area between the scoop 106 and the duct 116.

Figure 3B:
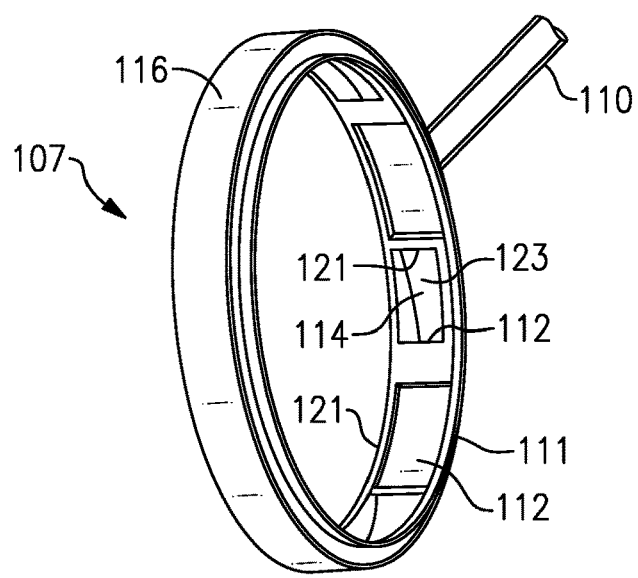
FIG. 3B shows an assembled view of the components in the oil scoop.

The duct 116 is shown positioned outwardly of the scoop 106 in FIG. 3B. This could be called a scoop and duct assembly 107.

While a single nozzle connected to the shroud is shown, multiple nozzles could be used. Also the nozzle(s) may be spaced from the shroud.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a rotating shaft;
   an oil scoop rotating with said rotating shaft, said oil scoop having end walls spaced axially along an axis of rotation of said rotating shaft and an axially central recess;
   a duct spaced radially outwardly of said oil scoop, and said duct having an oil inlet, with an oil supply nozzle to supply oil into said oil inlet in said duct, the oil inlet then connected to supply oil into said recess, said oil scoop having an inner hole to allow oil to flow from said recess to an outer periphery of said shaft; and
   wherein there is a gap between a radially outer location on said end walls and a radially inner surface on said duct, and said gap being less than 0.050 in (0.127 cm).

2. The gas turbine engine as set forth in claim 1, wherein said nozzle extends along an angle which is non-perpendicular to an axis of rotation of said rotating shaft.

3. The gas turbine engine as set forth in claim 2, wherein said nozzle extends along a direction which is generally tangential to an outer periphery of said rotating shaft.

4. The gas turbine engine as set forth in claim 3, wherein said duct having at least one breather hole for allowing air to flow into a chamber between said recess and an inner peripheral surface of said duct.

5. The gas turbine engine as set forth in claim 4, wherein there are a plurality of said breather holes.

6. The gas turbine engine as set forth in claim 1, wherein said oil scoop having a plurality of said inner holes at a radially inner surface to allow oil to flow to said shaft.

7. The gas turbine engine as set forth in claim 1, wherein said duct is fixed against rotation.

8. The gas turbine engine as set forth in claim 1, wherein the oil scoop is positioned axially adjacent a bearing supporting said rotating shaft.

9. The gas turbine engine as set forth in claim 1, wherein said duct having at least one breather hole for allowing air to flow into a chamber between said recess and an inner peripheral surface of said duct.

10. The gas turbine engine as set forth in claim 1, wherein said oil supply nozzle includes a plurality of oil supply nozzles.

11. A gas turbine engine comprising:
    a rotating shaft;
    an oil scoop rotating with said rotating shaft, said oil scoop having end walls spaced axially along an axis of rotation of said rotating shaft and an axially central recess;
    a duct spaced radially outwardly of said oil scoop, and said duct having an oil inlet, with an oil supply nozzle to supply oil into said oil inlet in said duct, the oil inlet then connected to supply oil into said recess, said oil scoop having an inner hole to allow oil to flow from said recess to an outer periphery of said shaft; and
    wherein said duct is fixed against rotation.

12. The gas turbine engine comprising:
    a turbine rotor driving a shaft, said shaft being supported on a bearing;
    an oil scoop rotating with said shaft, said oil scoop having end walls spaced axially along an axis of rotation of said shaft and an axially central recess;
    a duct spaced radially outwardly of said oil scoop, and said duct having an oil inlet, with an oil supply nozzle to supply oil into said oil inlet in said duct, the oil inlet then connected to supply oil into said recess, said oil scoop having an inner hole to allow oil to flow from said recess to an outer periphery of said shaft; and
    wherein said duct is fixed against rotation.

13. The gas turbine engine as set forth in claim 12, wherein there is a gap between a radially outer location on said end walls and a radially inner surface on said duct, and said gap being less than 0.050 in (0.127 cm).

14. The gas turbine engine as set forth in claim 12, wherein said nozzle extends along an angle which is non-perpendicular to an axis of rotation of said shaft.

15. The gas turbine engine as set forth in claim 14, wherein said nozzle extends along a direction which is generally tangential to an outer periphery of said shaft.

16. The gas turbine engine as set forth in claim 12, wherein said duct having at least one breather hole for allowing air to flow into a chamber between said recess and an inner peripheral surface of said duct.

17. The gas turbine engine as set forth in claim 12, wherein said oil scoop having a plurality of said inner holes at a radially inner surface to allow oil to flow to said shaft.

* * * * *